United States Patent [19]

Handler et al.

[11] Patent Number: 4,699,343
[45] Date of Patent: Oct. 13, 1987

[54] SUPPORT FOR WORKPIECES

[75] Inventors: Milton E. Handler, Northbrook; Richard Sylvan, Glenview; Michael Peterson, Evanston, all of Ill.

[73] Assignee: Hirsh Company, Skokie, Ill.

[21] Appl. No.: 898,310

[22] Filed: Aug. 20, 1986

Related U.S. Application Data

[63] Continuation-in-part of Ser. No. 732,917, May 13, 1985, abandoned.

[51] Int. Cl.⁴ .................................. F16M 11/00
[52] U.S. Cl. ........................ 248/157; 411/166; 403/408.1; 403/405.1
[58] Field of Search ............... 248/157, 405, 413, 165, 248/188.7, 188, 352, 188.2, 177; 182/182; 403/217, 402, 405.1, 408.1, 12, 13; 411/166, 174; 211/203

[56] References Cited

U.S. PATENT DOCUMENTS

| | | | |
|---|---|---|---|
| 1,673,721 | 6/1928 | Turner | 248/165 |
| 2,094,486 | 9/1937 | Cohen | 248/165 |
| 2,376,238 | 5/1945 | Dixon | 248/413 X |
| 2,554,599 | 5/1951 | Stovern | 248/413 X |
| 3,204,905 | 9/1965 | Marban | 403/217 X |
| 3,970,278 | 7/1976 | Studer | 248/165 X |
| 4,117,784 | 10/1938 | Piretti | 108/150 |
| 4,492,354 | 1/1985 | Rice | 182/182 X |
| 4,552,388 | 11/1985 | Meinig | 403/402 X |

FOREIGN PATENT DOCUMENTS

| | | | |
|---|---|---|---|
| 461396 | 10/1913 | France | 403/402 |
| 318210 | 6/1934 | Italy | 182/182 |

OTHER PUBLICATIONS

Magazine advertisement illustrating "Marvco Rolmate".
Magazine advertisement illustrating "Adjustable Height Roller Stand" and "New Roller Table."

Primary Examiner—Ramon S. Britts
Assistant Examiner—Blair M. Johnson
Attorney, Agent, or Firm—Dressler, Goldsmith, Shore, Sutker & Milnamow, Ltd.

[57] ABSTRACT

An adjustable support for workpieces is provided with a tripod base in which each of the three legs includes an angle bar having a vertical top segment. The top segments of the legs are securely connected together by a polyhedron shaped junction member. The junction member has a central collar for slidably receiving therein a vertical standard which carries a horizontal workpiece support bar. The junction member carries hand-operable locking means for cooperating with the standard and collar for securely locking the standard in a selected position.

4 Claims, 9 Drawing Figures

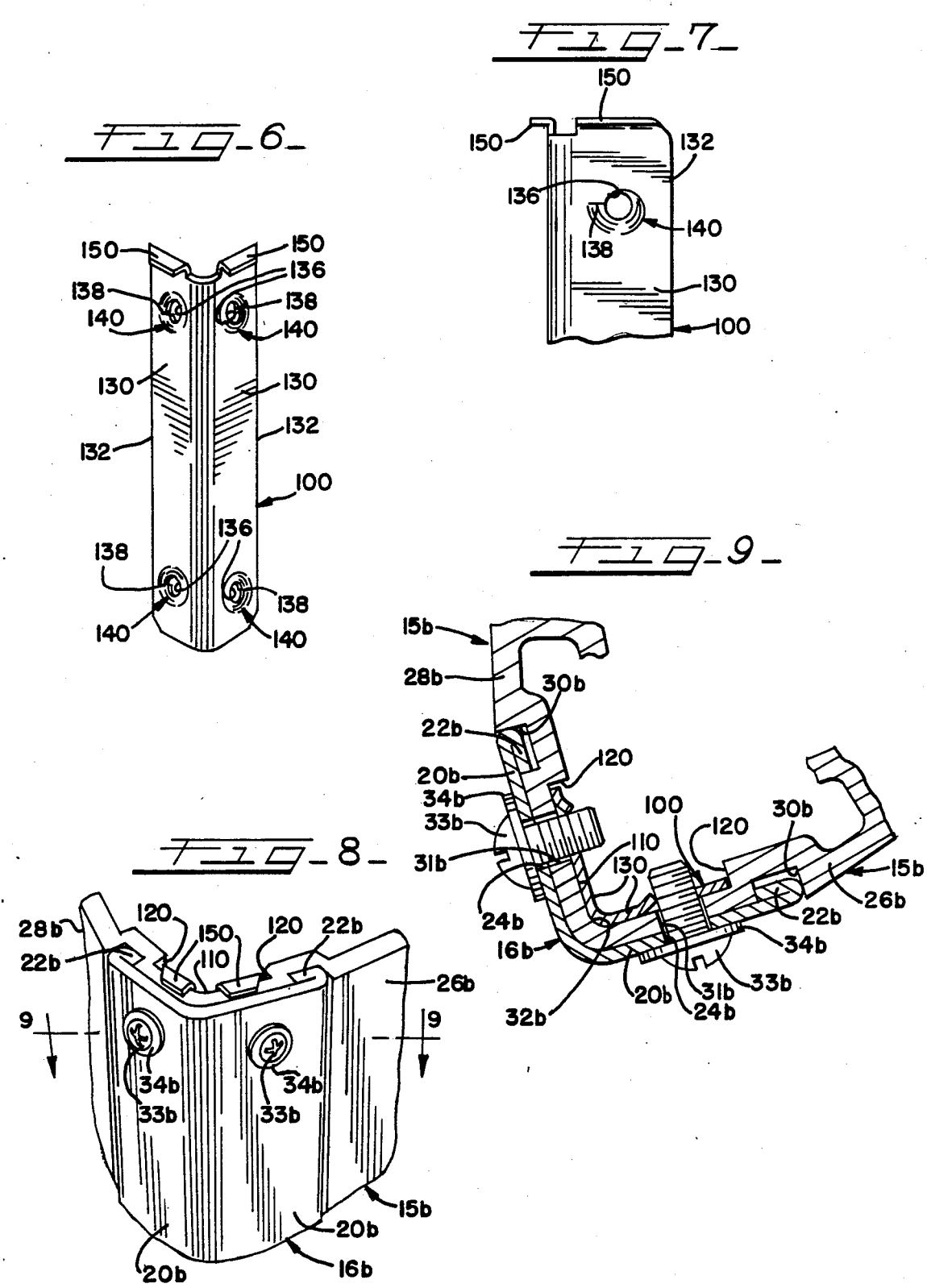

SUPPORT FOR WORKPIECES

SUPPORT FOR WORKPIECES

This application is a continuation-in-part application of the copending and commonly assigned U.S. patent application Ser. No. 732,917, filed May 13, 1985 now abandoned.

TECHNICAL FIELD

This invention relates to workshop supports for workpieces and, more particularly, to a support for workpieces which is portable and readily adjustable for use wherever desirable as an adjunct to more stationary workbenches or tables.

BACKGROUND OF THE INVENTION

People who work in carpentry or machine shops frequently encounter situations where existing work stations are inadequate for supporting the particular workpiece being handled. For example, long pieces of lumber, or large sections of sheet metal or wall paneling, usually are not properly supported by the bench or table where they are being worked on by such tools as a table saw, miter saw, radial arm saw, router or the like. Under such conditions, the solo worker must seek the aid of another worker or else find some means of supporting the workpiece so that he can continue to work efficiently alone.

A common expedient in those situations is to employ a saw horse or another table if one is available and can be conveniently moved to the position where needed. Of course, such expedients can never be entirely satisfactory for reasons well-known to those skilled in the art. In addition to the problem of portability, the saw horses or supplementary tables have supporting surfaces which are fixed in height so that the workpiece being supported thereon may not be at the proper elevation for the particular work station or tool being employed. Moreover, the frictional forces resulting from the weight of a large and heavy workpiece on a stationary supporting table make it very difficult to move the workpiece and feed the same past the tool doing the work.

While there have been prior efforts to cope with the described problems by supplying a portable and adjustable workpiece support, those prior efforts have not met with complete success. In general, the prior devices of this type comprised a base which supported a vertical or angled standard having a horizontal cross member for supporting the workpiece. The supporting cross member had rollers for facilitating movement and feed of the workpiece, and the standard was adjustable in the base for achieving the desired height of the workpiece. Frequently, the means for locking the standard at the adjusted height was difficult to manipulate or resulted in an insecure lock so that the weight of a heavy workpiece on the supporting cross member might cause the standard to slip downwardly. Other problems related to cost, the rigidity of the entire structure, and the difficulty of operationally assembling the same, such devices often being sold in knocked-down form.

There thus exists a need for a support for workpieces which is relatively inexpensive and yet sturdy, simple to operate, provides a positive lock at any adjusted position, and simple to assemble when purchased in knocked-down form.

SUMMARY OF THE INVENTION

The present invention provides an adjustable support for workpieces which overcomes problems of the type alluded to above.

In one preferred form, the support is provided as a kit which can be assembled from knocked-down components. The support includes a plurality of legs for defining a base. Each leg has a top segment defined by two diverging flanges which each have a folded over side edge.

The support also includes a unitary polyhedron junction member for interconnecting the top segments of the legs. The junction member includes side walls defining corners for being received between the leg flanges. A portion of the exterior of each side wall at each of the corners is recessed inwardly by an amount substantially equal to the thickness of the adjacent leg flange. Each side wall at each corner defines a groove spaced from the corner for receiving the folded over side edge of one of the adjacent leg flanges so that the exterior surfaces of the leg top segments are substantially flush with the exposed vertical exterior surfaces of the junction member side walls.

The junction member also has a central collar unitary width, and formed centrally of, the junction member side walls and connected thereto by spaced webs. The central collar defines an internal receiving region.

The support also includes (1) a vertical rod for being slidably received in the receiving region of the central collar and (2) a workpiece support member for being carried by the vertical rod.

Finally, a locking means is provided for being carried by the junction member and manually operable for locking the vertical rod in a selected position.

Another form of the invention includes a recess defined on the interior of the side walls at each corner of the junction member. The recess is defined along vertical margins therof by two spaced-apart, inwardly projecting retaining surfaces. The side walls at the corners of the junction member also define fastener-receiving apertures.

Each flange of each leg defines a fastener-receiving aperture, and the flanges are disposed adjacent the junction member side walls at the junction member corners with the leg flange fastener-receiving apertures aligned with the side wall fastener-receiving apertures.

A plurality of threaded fasteners are provided, and each fastener is disposed through one of the leg flange fastener-receiving apertures and one of the aligned side wall fastener-receiving apertures.

A plurality of fastener-engaging members are provided. Each fastener-engaging member is disposed at one of the junction member corners within one of the interior recesses. Each fastener-engaging member includes a pair of diverging flanges. Each fastener-engaging member flange defines a thread means for being aligned with, and threadingly engaged with, one of the fasteners. Each of the fastener-engaging member flanges has a vertical edge disposed within the recess adjacent one of the junction member retaining surfaces for preventing lateral displacement of the fastener-engaging member relative to the junction member. Further, each fastener-engaging member also includes an outwardly projecting tab at the top of each fastener-engaging member flange for engaging a top surface of one of the junction member side walls for preventing downward movement of the fastener-engaging member relative to the junction member.

Numerous other advantages and features of the present invention will become readily apparent from the following detailed description of the invention, from the claims and from the accompanying drawings.

BRIEF DESCRIPTION OF THE DRAWINGS

In the accompanying drawings forming a part of the specification, and in which like numerals are employed to designate like parts throughout the same:

FIG. 6 is a perspective view of a fastener-engaging member which forms part of a third embodiment of the present invention;

FIG. 7 is a greatly enlarged, right-hand side elevational view of the fastener-engaging member illustrated in FIG. 6;

FIG. 8 is a fragmentary, perspective view of the junction member of the present invention shown connected to the top segment of a leg and secured with screws engaged with the fastener-engaging member illustrated in FIGS. 6 and 7; and FIG. 9 is an enlarged, fragmentary, cross-sectional view taken generally along the plane 9—9 in FIG. 8.

DETAILED DESCRIPTION OF THE INVENTION

Figure 1:
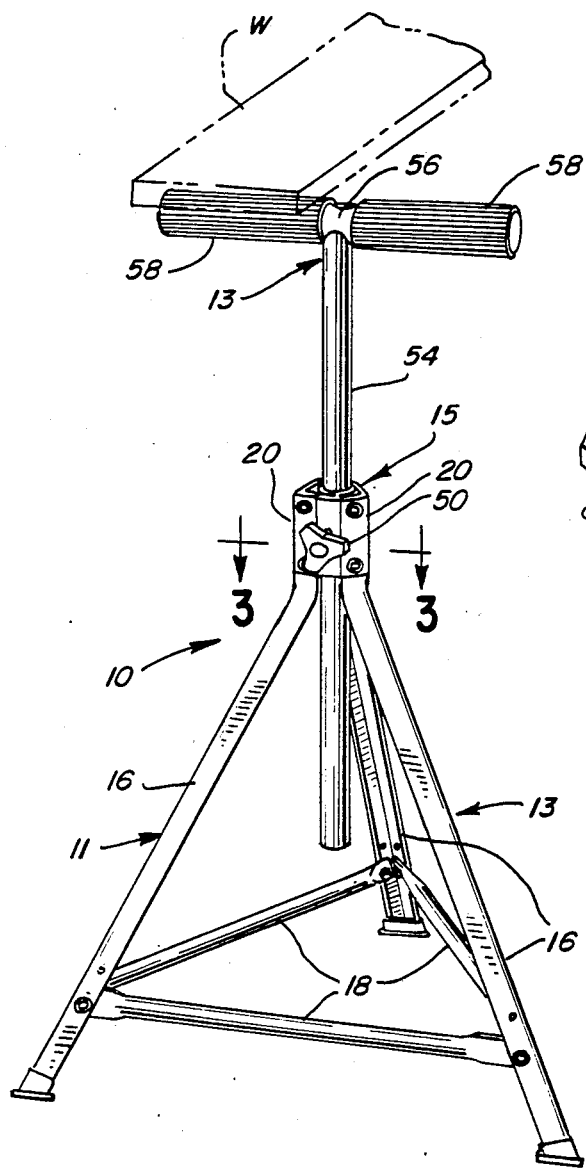
FIG. 1 is a perspective view of a first embodiment of an adjustable support for workpieces embodying the principles of the invention.

Referring now with greater particularity to the various FIGS. 1-4 of the drawings, it will be seen that the reference numeral 10 indicates generally a first embodiment of an adjustable support for workpieces embodying the principles of the invention. The support 10 comprises three basic elements, a base 11, a standard or vertical (upright) support rod 13, and a connector or junction member or bracket 15.

Base 11 comprises three legs 16 assembled in an equilateral tripod arrangement and interconnected adjacent the bottoms thereof by conventional means, such as nuts and bolts, with cross braces 18. Adjacent their tops, the legs 16 are each bent to provide an upright or vertical top segment 20.

Preferably, the legs 16 are fabricated of conventional 90° angle irons having diverging flanges. In the preferred embodiment, each flange has a folded over or rolled side edge 22 (see FIGS. 2 and 3).

Each flange of the top segment 20 is also formed with a pair of fastener-receiving apertures 24, by means of which the legs 16 are connected to the junction member 15 with bolts or screws 33.

Junction member 15 comprises side walls 26, 27, and 28 which together generally define a body having a substantially overall polyhedron exterior shape. It will be noted that, at the junctions of the side walls 26 and 27, 27 and 28, and 28 and 26, the side walls define substantially right angle corners 32. Side walls 26, 27, and 28 each comprise three integral planar sections which together extend in different vertical planes from one corner of the junction member 15 to another corner.

Each of the side walls 26, 27, and 28 is formed with a pair of elongated grooves 30 for receiving the leg flange edges 22. Each of the side walls 26, 27, and 28 also defines spaced pairs of fastener-receiving apertures 31 adapted to align with the apertures 24 in the flanges of the leg top segments 20.

Figure 2:
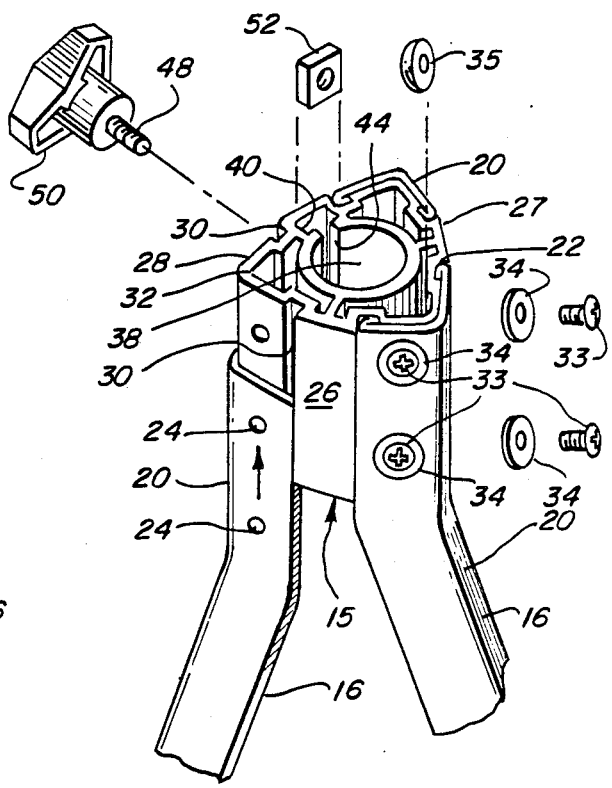
FIG. 2 is an enlarged, fragmentary, exploded perspective view of some of the support components.
Figure 3:
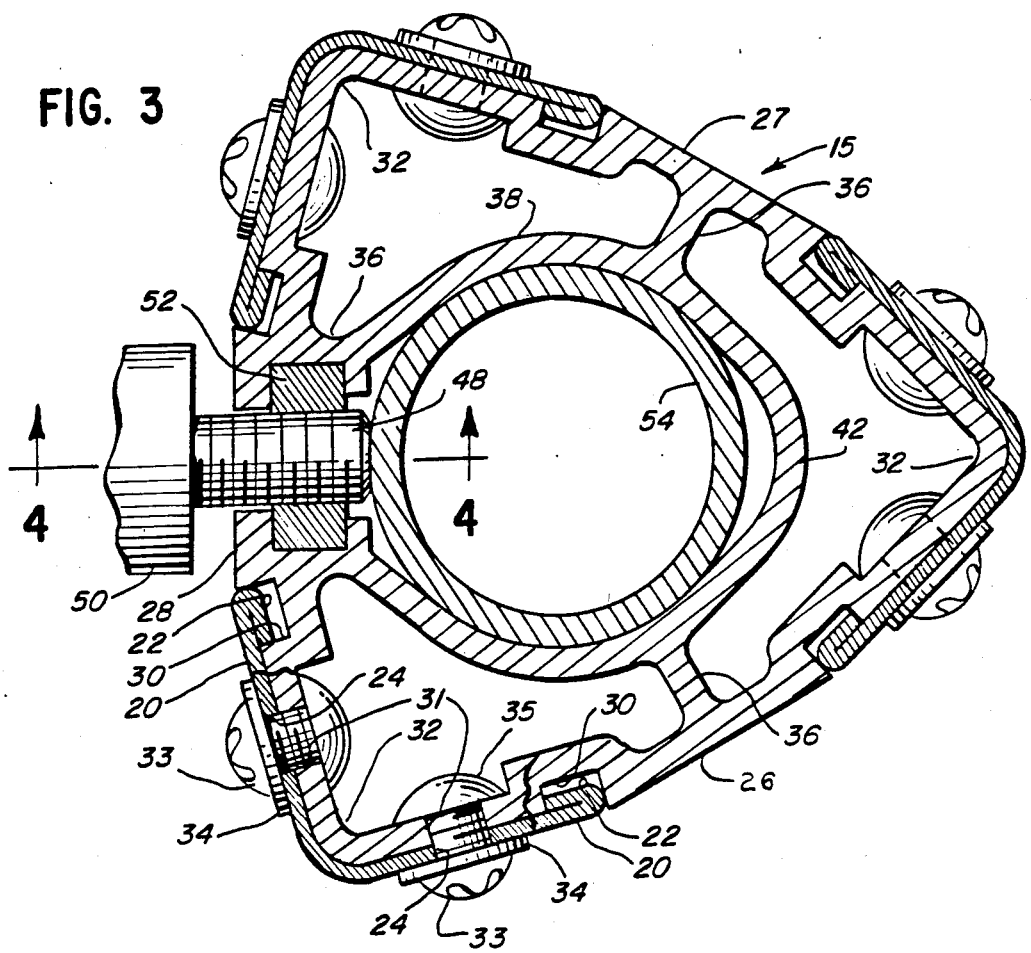
FIG. 3 is a further enlarged, fragmentary, cross-sectional view taken generally along the plane 3—3 in FIG. 1.
Figure 4:
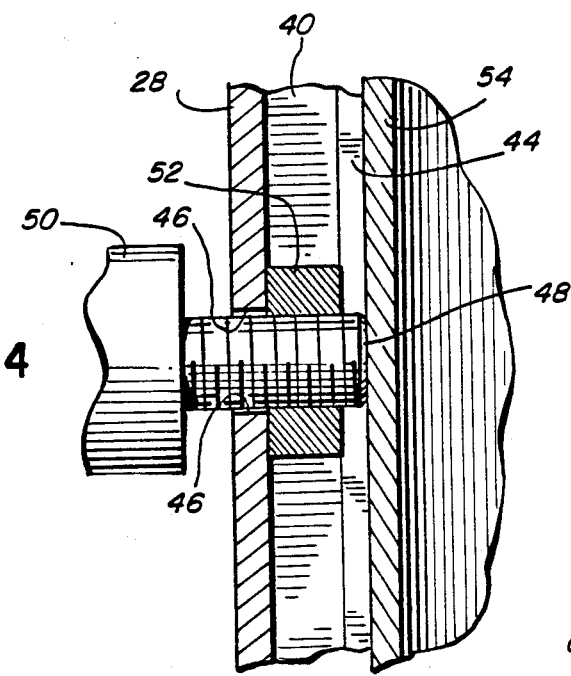
FIG. 4 is a fragmentary, cross-sectional view taken generally along the plane 4—4 in FIG. 3.

As illustrated in FIGS. 2 and 3 of the drawings, the flanges of the top segments 20 of the legs 16 receive the corners 32 of the junction member 15 in a mating contour-accommodating relationship with the rolled edges 22 of the legs being received in the junction member grooves 30. Conventional connectors, such as bolts, washers, and button nuts (numerals 33, 34 and 35, respectively) are applied at the aligned mounting holes 24 and 30 to provide a rigid connection for the top segments 20 of the legs 16.

As best illustrated in FIG. 3, the planar sections of the side walls of the junction member 15 adjacent the corners of the junction member are recessed inwardly somewhat to define a seating surface for the flanges of the top segments 20 of the legs 16. The depth of the recess is substantially equal to the thickness of the leg flange. The combination of this recess with the groove 30 permits the leg flange to lie substantially flush with the exposed vertical exterior surfaces of the junction member 15.

With continued reference to FIG. 3, the junction member 15 also has a central wall or collar 38 spaced inwardly of the side walls 26, 27, and 28 and connected to the side walls by spaced webs 36. The junction member 15 also includes a rectangular channel 40 associated with the side 28. Central collar 38 is generally annular in configuration to define a receiving region but includes segment 42 having a partial ovate shape opposite the side wall 28 of the junction member 15. Adjacent the side wall 28, the collar wall 38 is open to define a vertical slot 44 communicating with the rectangular channel 40.

The side wall 28 is formed with an opening 46 through which is mounted the bolt 48 of a locking knob 50, and the bolt 48 is threadingly engaged by a rectangular nut 52 which is non-rotatably retained or trapped in the rectangular channel 40. It will thus be appreciated that rotation of the locking knob 50 causes the bolt 48 to enter further into, or withdraw from, the central collar 38 through the slot 44.

The standard 13 comprises an elongated tubular, vertical rod 54 which is adapted to be slidably received in the receiving region of the collar 38 of the bracket 15. A transverse or horizontal support rod 56 is mounted to the top of the rod 54 by conventional connnector means, and the rod 56 carries rubber rollers 58 adapted to support a workpiece, such as the board W, thereon.

To adjust the height of the standard 13 and support rod 56, it is simply necessary to loosen the locking knob 50, make the adjustment, and then tighten the knob 50 to lock the rod 54 in place. It is important to note that when the locking bolt 48 bears against the rod 54, the rod 54 is urged toward the reduced diameter ovate segment 42 of the junction member central collar 38. There is thus provided a secure lock to prevent accidental slippage of the rod 54 when a workpiece is being supported thereon.

Figure 5:
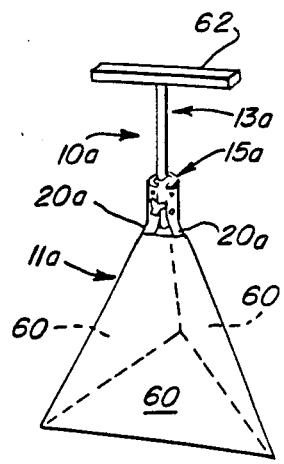
FIG. 5 is a perspective view of a second embodiment of the invention.

It will be appreciated that the configuration of certain elements of the support 10 could be varied without departing from the spirit of the invention. Thus, for example, there is illustrated in FIG. 5 a modified support, or second embodiment, 10a having a base 11a comprising joined support panels 60 instead of the three long legs of the preferred embodiment illustrated in FIGS. 1-4. The panels 60 carry vertical angle members or legs 20a which are connected to a junction bracket 15a, which adjustably supports a standard 13a. In this embodiment, the standard 13a carries a horizontal support bar 62 which is non-rotatable and has a planar, low-friction top surface for supporting the workpiece.

FIGS. 6-7 illustrate a third embodiment of the present invention. The third embodiment of the adjustable support of the present invention includes many elements that are identical to those of the first embodiment described above with reference to FIGS. 1-4. The elements of the third embodiment of the adjustable support that are identical to those of the first embodiment are designated by reference numerals identical to those used for the first embodiment with the exception that the third embodiment reference numerals are followed by the lower case letter b. Specifically, with the exception of the button nuts 35 employed in the first embodiment of the invention, the components of the first embodiment are identical to those used in the third embodiment.

In the third embodiment of the invention as illustrated in FIGS. 6-9, the nuts are replaced by novel fastener-engaging members 100. The fastener-engaging members 100 are each adapted to be disposed at one of the junction member corners. To this end, it is to be noted that the junction member side walls (e.g., side walls 26b and 28b in FIGS. 8 and 9) define at each corner of the junction member a recess 110 for receiving a fastener-engaging member 100. Further, each recess 110 is defined along the vertical margin thereof by two spaced-apart, inwardly projecting, retaining surfaces 120.

As best illustrated in FIG. 6, each fastener-engaging member 100 includes a pair of diverging flanges 130. In the preferred embodiment illustrated, the flanges 130 are oriented at a substantially right angle. Each flange 130 has a vertical edge 132 which is positioned within the recess 110 adjacent one of the above-described inwardly projecting retaining surfaces 120.

Each of the flanges 130 defines thread means 140 for being aligned with, and for threadingly engaging, one of the fasteners or screws 33b. In the preferred embodiment illustrated, each thread means 140 includes a generally annular portion of the fastener-engaging member 100 that defines a circular aperture 136 (FIGS. 6 and 7) and that is deformed in a partial helical shape around the circular aperture 136. The thread means annular portion is at least partially defined by a slit 138 which, in the side elevation view illustrated in FIG. 7, appears oriented perpendicular to the axis of the circular aperture 136. The helical annular portion forming the thread means 140 is adapted to threadingly engage the thread of the screw or other fastener 33b.

Each fastener-engaging member 100 also includes an outwardly projecting tab 150 at the top of each flange 130.

The novel fastener-engaging member 100 cooperates with the novel structure of the junction member 15b to facilitate assembly of the adjustable support components. Specifically, a fastener-engaging member 100 may be dropped into the recess 110 of the junction member 15b from the top of the junction member 15b in the opening between the central collar and the side walls. The tabs 150 at the top of the fastener-engaging member 100 prevent downward movement of the fastener-engaging member 100 relative to the junction member 15b beyond the desired position wherein the thread means 140 are properly aligned with the junction member side wall fastener-receiving apertures 31b.

Further, the vertical edge 132 on each flange 130 of the fastener-engaging member 100 prevents lateral displacement of the fastener-engaging member 100 relative to the junction member 15b. That is, the vertical edges 132 of the fastener-engaging member 100 engage the inwardly projecting retaining surfaces 120 if an attempt is made to urge the fastener-engaging member 100 inwardly away from the junction member side walls. Thus, when the junction member 15b is held in the normal, upright position during assembly of the components, or even when the junction member 15b is tilted away from the upright position, the fastener-engaging members 100 remain properly positioned. As a result, the person assembling the components does not have to physically hold the fastener-engaging members 100 in position within the junction bracket 15b. This permits the person assembling the components to use his hands for other tasks, such as positioning a leg 16b against a corner of the junction member 15b and threading a screw 33b into engagement with the fastener-engaging member 100.

It will be readily observed from the foregoing detailed description of the invention and from the illustrated embodiments thereof that numerous variations and modifications may be effected without departing from the true spirit and scope of the novel concepts or principles of this invention.

What is claimed is:

1. An adjustable support for workpieces comprising:
   a polyhedron junction member including side walls defining corners and defining at each said corner a recess on the interior of said side walls, each said recess being defined along vertical margins thereof by two spaced-apart, inwardly projecting retaining surfaces, said side walls at said corners also defining fastener-receiving apertures;
   a plurality of legs each including two diverging flanges which each define a fastener-receiving aperture and which are each disposed adjacent one of said junction member side walls at one of said corners with one of said leg flange fastener-receiving apertures aligned with one of said side wall fastener-receiving apertures;
   a vertical rod slidably received in said junction member, said rod carrying a workpiece support member;
   locking means carried by said junction member and manually operable for locking said vertical rod in a selected position;
   a plurality of threaded fasteners each disposed through one of said leg flange fastener-receiving apertures and one of said aligned side wall fastener-receiving apertures; and
   a plurality of fastener-engaging members each disposed at one of said junction member corners within one of said recesses, each said fastener-engaging member including a pair of diverging flanges, each said fastener-engaging member flange defining a thread means for being aligned with and threadingly engaging one of said fasteners, each said fastener-engaging member flange having a vertical edge positioned within within said recess adjacent one of said junction member retaining surfaces for preventing lateral displacement of said fastener-engaging member relative to said junction member, each said fastener-engaging member also including an outwardly projecting tab at the top of each said fastener-engaging member flange for engaging a top surface of one of said junction member side walls for preventing downward movement of said fastener-engaging member relative to said junction member.

2. An adjustable support in accordance with claim 1 in which said flanges of each said fastener-engaging member are oriented at a substantially right angle.

3. An adjustable support in accordance with claim 1 in which each said thread means includes a generally annular portion of one of said fastener-engaging members that defines a fastener-receiving circular aperture and that is deformed in a partial helical shape around said circular aperture.

4. An adjustable support in accordance with claim 3 in which said annular portion is at least partially defined by a slit normal to the axis of said circular aperture.

* * * * *